(12) United States Patent
Hara et al.

(10) Patent No.: US 6,602,937 B2
(45) Date of Patent: Aug. 5, 2003

(54) REDISPERSIBLE SYNTHETIC RESIN POWDER AND USE THEREOF

(75) Inventors: Kouji Hara, Ibaraki (JP); Mitsuo Shibutani, Ibaraki (JP); Kiyoharu Kitamura, Ibaraki (JP)

(73) Assignee: Nippon Synthetic Industry Co., Ltd., Osaka-Fu (JP)

( * ) Notice: Subject to any disclaimer, the term of this patent is extended or adjusted under 35 U.S.C. 154(b) by 0 days.

(21) Appl. No.: 09/863,992

(22) Filed: May 23, 2001

(65) Prior Publication Data

US 2002/0077416 A1 Jun. 20, 2002

(30) Foreign Application Priority Data

May 25, 2000 (JP) ........................................ 2000-154015

(51) Int. Cl.7 ........................... C08L 29/04; C04B 26/04
(52) U.S. Cl. ..................... 524/5; 524/4; 524/8; 525/57; 525/59
(58) Field of Search ....................... 524/4, 5, 8; 525/57, 525/59

(56) References Cited

U.S. PATENT DOCUMENTS

| 4,912,184 A | | 3/1990 | Akasaki et al. |
| 5,629,378 A | * | 5/1997 | Takada |
| 5,719,231 A | | 2/1998 | Famili |
| 6,001,903 A | * | 12/1999 | Nakamae |

FOREIGN PATENT DOCUMENTS

| EP | 0124782 A | 11/1984 |
| EP | 0765885 A1 | 4/1997 |
| EP | 1038903 A | 9/2000 |
| JP | 60245611 A | 12/1985 |
| JP | 6-093017 | * 4/1994 |

* cited by examiner

Primary Examiner—David J. Buttner
(74) Attorney, Agent, or Firm—Harness, Dickey & Pierce, P.L.C.

(57) ABSTRACT

A redispersible synthetic resin powder comprising particles of a polymer made from at least one monomer selected from the group consisting of ethylenically unsaturated monomers and diene monomers, and a polyvinyl alcohol resin having at least one functional group selected from the group consisting of acetoacetoxy group and mercapto group and having a block character $[\eta]$ of 0.3 to 0.6, wherein said polyvinyl alcohol resin is adsorbed onto the surface of said particles. The powder has excellent redispersibility, blocking resistance, film forming property and water resistance, can be easily dispersed into water to form emulsions and is also useful as an admixture for cement and mortar.

20 Claims, No Drawings

REDISPERSIBLE SYNTHETIC RESIN POWDER AND USE THEREOF

BACKGROUND OF THE INVENTION

The present invention relates to a redispersible synthetic resin powder comprising as a main component a resin made of an ethylenically unsaturated monomer and/or a diene monomer, such as acrylic resins, and the use of the powder. More particularly, the present invention relates to a redispersible synthetic resin powder having excellent properties, such as blocking resistance, dispersibility in redispersion, film forming property and water resistance of films formed from the powder, and being useful as an admixture for cement and mortar. The present invention also relates to an admixture for cement and mortar comprising the powder.

Emulsions of synthetic resins such as vinyl acetate resins and acrylic resins have been widely used in adhesives, coatings and the like. The emulsions are generally supplied in the form of liquid. The supply of liquid emulsions is disadvantageous in that the transportation is expensive, emulsions may freeze in winter or change its quality with the lapse of time and treatment of waste water may be required after the use of emulsions.

In view of these disadvantages, recently, emulsions are dried, and powders are supplied and used in various fields. Upon the use, the powders are dispersed into water again. Therefore, the powders are required to have a good redispersibility into water.

Japanese Patent Publication Kokai No. 7-157565 discloses a redispersible emulsion powder of a synthetic resin obtained by spray-drying an emulsion prepared by emulsion polymerization of ethylenically unsaturated monomer using an acetoacetylated (acetoacetyloxy group-containing) polyvinyl alcohol as a protective colloid for the purpose of improving the redispersibility and the water resistance of films formed therefrom. Japanese Patent Publications Kokai No. 9-151221 and Kokai No. 11-263848 disclose a synthetic resin powder wherein a polyvinyl alcohol polymer is chemically bonded to the surface of particles of a polymer of an ethylenically unsaturated monomer or a diene monomer through a terminal sulfide bond for the purpose of improving the redispersibility, the film forming property and the water resistance of films formed therefrom. Further, Japanese Patent Publication Kokai No. 11-279361 discloses an emulsion powder wherein a polyvinyl alcohol polymer having specific structural units such as carboxyethyl group is used for the same purpose as the above.

However, according to the present inventors' investigation, the redispersible synthetic resin emulsion powder disclosed in Japanese Patent Publication Kokai No. 7-157565 has improved redispersibility and water resistance of films, but the improvement is not satisfactory. Further, in case of using vinyl ester monomers as the ethylenically unsaturated monomer, the obtained redispersible powder is poor in alkali resistance. In case of other ethylenically unsaturated monomers, the alkali resistance is good, but the emulsion polymerization stability is very low and it is difficult to obtain good emulsions.

The synthetic resin powders disclosed in Japanese Patent Publications Kokai No. 9-151221, Kokai No. 11-263848 and Kokai No. 11-279361 have improved redispersibility, film forming property and blocking resistance, but the improvement is not satisfactory. The water resistance is also not satisfactory, and further improvement of these properties is needed.

Thus, it is an object of the present invention to provide a synthetic resin powder which is excellent particularly in properties such as redispersibility, film forming property, water resistance and blocking resistance and, in addition, which is prepared by an emulsion polymerization with an improved stability.

This and other objects of the present invention will become apparent from the description hereinafter.

SUMMARY OF THE INVENTION

It has been found that a synthetic resin powder obtained from a synthetic resin emulsion containing a polyvinyl alcohol resin having an acetoacetoxy group and/or a mercapto group and having a block character $[\eta]$ of 0.3 to 0.6 meets the above-mentioned requirements.

Thus, in accordance with the present invention, there is provided a redispersible synthetic resin powder comprising particles of a polymer made from at least one member selected from the group consisting of ethylenically unsaturated monomers and diene monomers, and a polyvinyl alcohol resin having at least one member selected from the group consisting of acetoacetoxy group and mercapto group and having a block character $[\eta]$ of 0.3 to 0.6, wherein said polyvinyl alcohol resin is adsorbed onto the surface of said particles.

The term "block character" as used herein denotes a value obtained from the intensity ratio of peaks based on methylene carbon portions found within the range of 40 to 49 ppm in measurement of $^{13}$C-NMR using 3-(trimethylsiliy)propionic-2,2,3,3-$d_4$acid sodium salt as an internal standard material [chemical shift of (OH, OH) dyad=46–49 ppm, chemical shift of (OH, OR) dyad=43.5–45.5 ppm, and chemical shift of (OR, OR) dyad=40–43 ppm, wherein OR denotes O-acetyl group and/or O-acetoacetyl group], and it is calculated by the following equation (1):

$$[\eta]=(OH, OR)/2(OH)(OR) \qquad (1)$$

wherein (OH, OR), (OH) and (OR) are calculated by molar fraction respectively, (OH) denotes a degree of hydrolysis (molar fraction) calculated from integral ratio in 13C-NMR and (OR) denotes the molar fraction of acetyloxy group and/or acetoacetyloxy group.

DETAILED DESCRIPTION

The redispersible synthetic resin powder of the present invention comprises particles of a polymer of at least one monomer selected from the group consisting of ethylenically unsaturated monomers and diene monomers, and a specific polyvinyl alcohol resin adsorbed (adhering) onto the surface of the polymer particles. All monomers which have been conventionally used in emulsion polymerization are applicable to the present invention. Representative ethylenically unsaturated monomers and diene monomers used in the present invention include vinyl ester monomers, acrylic ester monomers (including acrylic and methacrylic acid), conjugated diene monomers and non-conjugated diene monomers. Other suitable monomers include, for instance, olefin monomers, acrylamide monomers, nitrile monomers, styrene monomers, vinyl ether monomers, and allyl monomers.

Examples of the vinyl ester monomers are, for instance, vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, vinyl myristate, and the like. Examples of the acrylic ester monomers are, for instance, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, 2-ethylhexyl (meth)acrylate, dodecyl (meth)acrylate, octadecyl (meth)acrylate, other alkyl (meth)acrylates, and (meth)acrylic acid. Examples of the diene monomers are, for instance, butadiene-1,3, 2-methylbutadiene, 1,3- or 2,3-dimethylbutadiene-1,3, 2-chloro-butadiene-1,3, and the like.

Examples of the olefin monomers are, for instance, α-olefins such as ethylene, propylene, 1-butene and isobutene, and halogenated olefins such as vinyl chloride, vinylidene chloride, vinyl fluoride and vinylidene fluoride. Examples of the acrylamide monomers are, for instance, (meth)acrylamide, N-methylolacrylamide, N,N-dimethylacrylamide, acrylamide-2-methylpropane sulfonic acid, diacetone acrylamide, and the like. Examples of the nitrile monomers are, for instance, (meth)acrylonitrile and the like. Examples of the styrene monomers are, for instance, styrene, α-methylstyrene, a halostyrene and other styrene derivatives. Examples of the vinyl ether monomers are, for instance, n-propyl vinyl ether, isopropyl vinyl ether, n-butyl vinyl ether, isobutyl vinyl ether, t-butyl vinyl ether, dodecyl vinyl ether, stearyl vinyl ether, and the like. Examples of the allyl monomers are, for instance, allylacetic acid, allyl chloride, and the like.

Other monomers can be used in the present invention, e.g., carboxyl group-containing compounds such as fumaric acid, maleic acid, maleic anhydride, itaconic acid, itaconic anhydride and trimellitic anhydride; esters of the carboxyl group-containing compounds; sulfo group-containing compounds such as ethylene sulfonic acid, allyl sulfonic acid, methallyl sulfonic acid and 2-acrylamide-2-methylpropane sulfonic acid; vinyl silane compounds such as vinyltrimethoxysilane; isopropenyl acetate; and 3-(meth)acrylamide-propyltrimethyl ammonium chloride.

Of these, a combination of a (meth)acrylic acid ester, styrene and a butadiene series monomer is preferable from the viewpoint of the alkali resistance of the obtained synthetic resin powder.

Each of the ethylenically unsaturated monomers and the diene monomers may be used alone or in admixture thereof to produce homopolymers and copolymers.

Representative examples of the polymer are, for instance, copolymers of vinyl acetate and an acrylic ester monomer, e.g., copolymers of 70 to 90% by weight of vinyl acetate and 30 to 10% by weight of an alkyl (meth)acrylate; acrylic copolymers, e.g., copolymers of 40 to 60% by weight of butyl acrylate and 60 to 40% by weight of methyl methacralte; and vinyl acetate homopolymer.

The largest feature of the present invention resides in that a polyvinyl alcohol resin to be adsorbed onto the surface of particles of a polymer of at least one member selected from the group consisting of the ethylenically unsaturated monomers and the diene monomers has a specific functional group and a block character [η] of 0.3 to 0.6.

The polyvinyl alcohol resin (which may be hereinafter referred to as "PVA") used in the present invention has at least one functional group selected from the group consisting of acetoacetoxy group and mercapto group. PVA having these functional groups (which may be hereinafter referred to as "functional group-containing PVA") will be explained below.

[Acetoacetoxy group-containing PVA]

The acetoacetoxy group-containing PVA (which may be hereinafter referred to as "AA-PVA") used in the present invention is a PVA to which acetoacetoxy group is introduced, for example, by reacting PVA with a diketene or by reacting PVA with acetoacetic acid to conduct transesterification as mentioned after. As the starting PVA are used hydrolysis products of polyvinyl acetate or their derivatives wherein the hydrolysis products are generally obtained by subjecting a lower alcohol solution of polyvinyl acetate to hydrolysis in the presence of a hydrolysis catalyst such as an alkali or an acid according to known methods. Hydrolysis products of copolymers of vinyl acetate and other monomers copolymerizable therewith can also be used as the starting PVA so long as the properties to be achieved by the present invention are not impaired. The content of other monomers copolymerizable with vinyl acetate is usually at most 10% by mole, especially at most 5% by weight.

Examples of such copolymerizable monomers are, for instance, an olefin such as ethylene, propylene, isobutyrene, α-octene, α-dodecene or α-octadecene; an unsaturated acid or its salts such as acrylic acid, methacrylic acid, crotonic acid, maleic acid, maleic anhydride or itaconic acid; a monoalkyl or dialkyl ester of the unsaturated acid; a nitrile compound such as acrylonitrile or methacrylonitrile; an amide such as diacetone acrylamide, acrylamide or methacrylamide; an olefin sulfonic acid or its salts such as ethylene sulfonic acid, allyl sulfonic acid or methallyl sulfonic acid; an alkyl vinyl ether such as propyl vinyl ether; an ammonium group-containing monomer such as N-acrylamidemethyltrimethylammonium chloride, allyltrimethylammonium chloride or dimethyldiallylammonium chloride; dimethyallyl vinyl ketone; N-vinylpyrrolidone; vinyl chloride; vinylidene chloride; a polyoxyalkylene (meth)allyl ether such as polyoxyethylene (meth)allyl ether or polyoxypropylene (meth)allyl ether; a polyoxyalkylene (meth)acrylate such as polyoxyethylene (meth)acrylate or polyoxypropylene (meth)acrylate; a polyoxyalkylene (meth)acrylamide such as polyoxyethylene (meth)acrylamide or polyoxypropylene (meth)acrylamide; polyoxyethylene(1-(meth)acrylamide-1,1-dimethylpropyl) ester; a polyoxyalkylene vinyl ether such as polyoxyethylene vinyl ether or polyoxypropylene vinyl ether; a polyoxyalkylene allylamine such as polyoxyethylene allylamine or polyoxypropylene allylamine; a polyoxyalkylene vinylamine such as polyoxyethylene vinylamine or polyoxypropylene vinylamine; and the like.

The degree of hydrolysis and average degree of polymerization of PVA used as a starting material to produce AA-PVA are not particularly limited. Preferably, the degree of hydrolysis of the obtained AA-PVA is not less than 85% by mole, and is not more than 99% by mole, especially not more than 98% by mole, more especially not more than 95% by mole. If the degree of hydrolysis is less than 85% by mole, the PVA has a cloud point and therefore is limited in temperature of use as an emulsifier. If the degree of hydrolysis is more than 99% by mole, the redispersibility is lowered.

Preferably, the average degree of polymerization of the obtained AA-PVA is not less than 50, especially not less than 100, and is not more than 2,000, especially not more than 1,500, more especially not more than 600. It is difficult to industrially produce a PVA having an average degree of polymerization of less than 50. If the average degree of polymerization of the AA-PVA is more than 2,000, emulsions may have a undesirably high viscosity or the polymerization stability of emulsions is lowered.

The shape of the starting PVA is not particularly limited. However, from the viewpoints of uniform absorption of diketene, uniform reaction achieved thereby and improvement of conversion in reaction with diketene, it is preferable that the PVA is in the form of a powder and, in particular, the PVA has a narrow particle size distribution and is porous. Preferably, the PVA has a particle size of not less than 50 meshes, especially not less than 80 meshes, and is not more than 450 meshes, especially not more than 320 meshes.

Sometimes PVA contains several percentages by weight of water and an alcohol used in the preparation thereof. Since these react with diketene to consume the diketene and to lower the conversion of diketene, it is desirable to remove the alcohol and water from the PVA as much as possible prior to subjecting it to a reaction with diketene, for example, by heating PVA under a reduced pressure.

In the present invention, a powdery PVA can be used as the starting PVA as mentioned above. From the viewpoint of simplification of the preparation steps, it is also possible to use, as the starting PVA, a slurry of PVA containing a solvent (such as methanol, ethanol, propanol or isopropanol) obtained after the hydrolysis step in the preparation of PVA, the solvent of which is then replaced by a fatty acid ester.

The introduction of acetoacetoxy group into PVA can be carried out by various methods, e.g., a reaction of PVA with diketene, transesterification by a reaction of PVA with an acetoacetic acid ester, and a copolymerization of vinyl acetate and vinyl acetoacetate. From the viewpoints that the preparation process is simple and the obtained AA-PVA has a good quality, preferably the AA-PVA is prepared by a reaction of a powder PVA and diketene.

Preparation of AA-PVA by a reaction of PVA and diketene will be explained below, but the methods are not limited thereto.

The reaction of a PVA powder and diketene can be carried out in various manners, for example, by directly reacting PVA with gaseous or liquid diketene, by previously occluding an organic acid into the PVA powder and then spraying a liquid or gaseous diketene in an inert gas atmosphere to react PVA with diketene, or by spraying a mixture of an organic acid and a liquid diketene onto the PVA powder.

In case of the methods using an organic acid, acetic acid is the most advantageously used as the organic acid. However, the organic acid is not limited to acetic acid, and other organic acids such as propionic acid, butyric acid and isobutyric acid can be suitably used. The amount of the organic acid is preferably within the range that the PVA powder present in the reaction system can adsorb or absorb and occlude it. In other words, it is preferable that the organic acid is used in such an amount that the organic acid present separately from the PVA powder is not present in the reaction system. It is appropriate that the organic acid is present in the reaction system in an amount of 0.1 to 80 parts by weight, especially 0.5 to 50 parts by weight, more especially 5 to 30 parts by weight, per 100 parts by weight of PVA. If the amount of the organic acid is outside the above range, AA-PVA having a non-uniform distribution in degree of acetoacetoxylation is apt to be produced and the unreacted diketene tends to remain much and, also, there is a case that a gel is produced.

For uniform adsorption and occlusion of an organic acid into PVA are adoptable any of suitable means, such as spraying the organic acid alone onto PVA powder or spraying a solution of the organic acid dissolved in an appropriate solvent onto PVA powder.

In case of making diketene uniformly absorb or adsorb into a PVA powder in such a manner as spraying a liquid diketene onto the PVA powder, preferably the reaction of PVA and diketene is carried out in an atmosphere of an inert gas at a temperature of 20 to 120° C. for a predetermined time with stirring or under fluidized condition.

In case of reacting a diketene gas with PVA, the contact temperature is from 0 to 250° C., preferably from 25 to 100° C. It is preferable that the diketene gas is brought into contact with PVA under temperature and diketene partial pressure conditions that the diketene gas is not liquefied at the time of the contact of diketene with PVA, but it is acceptable without any hindrance that a part of the diketene gas is liquefied to liquid droplets.

The contact time is suitably selected from 1 minute to 6 hours depending on the contact temperature. That is to say, when the contact temperature is low, a longer time is selected, and when the contact temperature is high, a short time is sufficient.

The diketene gas can be supplied as it is or in the form of a mixture with an inert gas. Also, the temperature may be elevated after making the diketene gas absorb into the PVA powder, but preferably the PVA powder is firstly heated and is then brought into contact with the diketene gas.

Effective catalysts for acetoacetoxylation are basic compounds such as sodium acetate, potassium acetate, primary amines, secondary amines and tertiary amines, and the like. The amount of the catalyst is from 0.1 to 1.0% by weight based on the PVA powder. In many cases, it is not required to add the catalyst since the PVA powder usually contains sodium acetate. If the amount of the catalyst is too large, a side reaction of diketene is easy to occur.

Any of apparatuses which are equipped with a heating means and a stirrer can be used as a reactor for the acetoacetoxylation, e.g., kneader, Henschel mixer, ribbon blender, other various blenders, and agitated dryer.

It is preferable that the content of acetoacetoxy group in the thus obtained AA-PVA is at least 0.01% by mole, especially at least 0.03% by mole, more especially at least 0.05% by mole, and is at most 6% by weight, especially at most 4.5% by mole, more especially at most 4.0% by mole. If the content of acetoacetoxy group is less than 0.01% by mole, there is a case that the desired effects of the present invention are not sufficiently obtained. If the content is more than 6% by mole, the stability of emulsions is lowered or agglomerate is easy to be formed at the time of spray drying.

In the present invention, the AA-PVA is required to have a block character $[\eta]$ of 0.3 to 0.6. AA-PVA having a block character $[\eta]$ of less than 0.3 is hard to be industrially produced. If the block character is more than 0.6, emulsion polymerization stability and redispersibility are low and it is difficult to achieve the objects of the present invention. Preferable upper limit of the block character is 0.55.

The block character of AA-PVA can be controlled in such a manner that acetoxy groups are caused to remain in a high blockiness at the time of hydrolysis of polyvinyl acetate and the partially hydrolyzed polyvinyl acetate is then acetoacetoxylated. The blockiness of acetoxy groups can be increased in a manner such as including 3 to 40% by weight, especially 5 to 20% by weight, more especially 10 to 20% by weight, of a solvent having a low dielectric constant into a hydrolysis reaction system based on the total weight of the reaction system, or elevating the hydrolysis temperature to 40 to 50° C., or increasing the resin concentration in the hydrolysis reaction system, or conducting the hydrolysis in the absence of water. These manners can be suitably combined.

As the solvents having a low dielectric constant are preferred those having a dielectric constant of not more than 32 c.g.s.e.s.u. Examples of such solvents are, for instance, methanol (31.2 c.g.s.e.s.u.), a mixed solvent of methyl acetate/methanol=1/3 (27.1 c.g.s.e.s.u.), a mixed solvent of methyl acetate/methanol=1/1 (21.0 c.g.s.e.s.u.), a mixed solvent of methyl acetate/methanol=3/1 (13.9 c.g.s.e.s.u.), methyl acetate (7.03 c.g.s.e.s.u.), isopropyl acetate (6.3 c.g.s.e.s.u.), trichloroethylene (3.42 c.g.s.e.s.u.), xylene (2.37 c.g.s.e.s.u.), toluene (2.38 c.g.s.e.s.u.), benzene (2.28 c.g.s.e.s.u.), acetone (21.4 c.g.s.e.s.u.), and the like. Methyl acetate/methanol mixed solvents are preferably used.

[Mercapto group-containing PVA]

The mercapto group-containing PVA used in the present invention can be obtained by polymerizing vinyl acetate in the presence of a mercapto group-containing compound as a chain transfer agent and then hydrolyzing the resulting polyvinyl acetate. Examples of the mercapto group-containing compound are, for instance, organic thiolic acids such as thiolacetic acid, thiolpropionic acid, thiolbutyric acid and thiovaleric acid.

The polymerization of vinyl acetate using a mercapto compound as mentioned above as a chain transfer agent is carried out by determining the amount of the initial charge of a chain transfer agent having a mercapto group, e.g., an organic thiolic acid, depending on the desired degree of polymerization according to the following equation (1), starting the polymerization, and thereafter additionally charging the chain transfer agent in an amount calculated according to the following equation (2) in compliance with the rate of consumption of the chain transfer agent:

$$1/P = Cm + Cs([S]/[M]) + Cx([X]/[M]) \quad (1)$$

$$\text{Amount of additional charge} = Cx([X]/[M]) \times Rp \quad (2)$$

wherein P is a degree of polymerization, Cm is a chain transfer constant to a monomer $[4.8 \times 10^{-4} \times e^{(-1096/T)}]$, Cs is a chain transfer constant to a solvent $[2.0 \times 10^{-4} \ (60° \ C.)]$, Cx is a chain transfer constant of a chain transfer agent, [S] is a concentration of solvent (mole/liter), [M] is a concentration of monomer (mole/liter), [X] is a concentration of initially charged chain transfer agent (mole/liter), Rp is a rate of polymerization reaction (mole/liter/second), and T is a polymerization temperature (K).

The obtained polyvinyl acetate is then hydrolyzed in the same manner as in the preparation of AA-PVA. Preferably the degree of hydrolysis and average degree of polymerization of the obtained mercapto group-containing PVA are determined according to the case of AA-PVA.

In the present invention, the mercapto group-containing PVA is also required to control the block character [η] within the range of 0.3 to 0.6, like AA-PVA mentioned above. The method of controlling the block character is not particularly limited. In an industrial preparation, the control can be achieved by subjecting a polyvinyl acetate to an alkali hydrolysis in the presence of a solvent having various dielectric constants. In particular, solvents having a dielectric constant of not more than 32 c.g.s.e.s.u. are preferred as a solvent of the hydrolysis. Examples of such solvents are, for instance, methanol (31.2 c.g.s.e.s.u.), a mixed solvent of methyl acetate/methanol=1/3 (27.1 c.g.s.e.s.u.), a mixed solvent of methyl acetate/methanol=1/1 (21.0 c.g.s.e.s.u.), a mixed solvent of methyl acetate/methanol=3/1 (13.9 c.g.s.e.s.u.), methyl acetate (7.03 c.g.s.e.s.u.), isopropyl acetate (6.3 c.g.s.e.s.u.), trichloroethylene (3.42 c.g.s.e.s.u.), xylene (2.37 c.g.s.e.s.u.), toluene (2.38 c.g.s.e.s.u.), benzene (2.28 c.g.s.e.s.u.), acetone (21.4 c.g.s.e.s.u.), and the like. Methyl acetate/methanol mixed solvents are preferably used as a hydrolysis solvent.

The temperature and resin concentration in the hydrolysis are not particularly limited. Preferably, the hydrolysis temperature is somewhat lower than the boiling point of a hydrolysis solvent. Preferably, the resin concentration in the hydrolysis is from 30 to 65% by weight, especially from 40 to 50% by weight.

[Redispersible synthetic resin powder]

The redispersible synthetic resin powder of the present invention is particles of a polymer of at least one monomer selected from the group consisting of ethylenically unsaturated monomers and diene monomers as mentioned above, onto the surface of which a functional group-containing PVA as mentioned above is adsorbed. The method for preparing such a powder is not limited, but the dispersible powder is usually prepared by forming an emulsion (or a solution) of the polymer particles which contains the functional group-containing PVA and drying the emulsion to remove water therefrom, thereby completely covering the surface of the polymer particles with the PVA. The method is explained below, but is not limited thereto.

The polymer emulsion can be obtained by emulsion polymerization of a monomer or monomers as mentioned above or by emulsification of the polymer.

The emulsion polymerization can be carried out, for example, by a usual emulsion polymerization method (1) wherein an ethylenically unsaturated monomer and/or a diene monomer is added all at once or continuously to an aqueous medium, typically water, in the presence of the functional group-containing PVA and a polymerization initiator and is polymerized with stirring at an elevated temperature, or an emulsion polymerization method (2) wherein an ethylenically unsaturated monomer and/or a diene monomer is dispersed into an aqueous solution of the functional group-containing PVA, and the resulting dispersion (pre-emulsion) is added all at once or continuously to a system containing an aqueous medium, typically water, a polymerization initiator and optionally the funcitonal group-contaiing PVA to conduct the polymerization with stirring at an elevated temperature.

The amount of the functional group-containing PVA somewhat varies depending on the kind thereof and the resin content of an emulsion to be prepared. In general, it is preferable that the amount is at least 0.1% by weight, especially at least 1% by weight, more especially at least 2% by weight, based on the total weight of the emulsion polymerization system, and is at most 30% by weight, especially at most 25% by weight, more especially at most 20% by weight, based on the total weight of the emulsion polymerization system. If the amount of the functional group-containing PVA is less than 0.1% by weight, it is difficult to maintain a stably emulsified state of the produced polymer particles. If the amount is more than 30% by weight, the viscosity of the emulsion becomes too high to lower the workability.

Known polymerization initiators conventionally used in emulsion polymerization can be used in the present invention. In general, polymerization initiators such as potassium persulfate, ammonium persulfate and potassium bromate are used alone or in combination with sodium bisulfite. Water-soluble redox initiators are also useful, e.g., hydrogen peroxide-tartaric acid, hydrogen peroxide-iron salt, hydrogen peroxide-ascorbic acid-iron salt, hydrogen peroxide-Rongalit, and hydrogen peroxide-Rongalit-iron salt. Commercially available catalysts composed of an organic peroxide and a redox system can also be used, e.g., KAYABUTYL B and KAYABUTYL A-50C made by Kayaku Akzo Kabushiki Kaisha.

The manner of adding the polymerization initiator is not particularly limited. For example, the initiator can be added all at once in the initial stage of the polymerization or can be continuously added with the progress of the polymerization.

In the emulsion polymerization, a water-soluble high molecular compound, a non-ionic surface active agent or an anionic surface active agent can also be used as a dispersing stabilizer.

Representative water-soluble high molecular compounds are polyvinyl alcohol resins other than the above-mentioned functional group-containing PVA. Examples thereof are, for instance, non-modified PVA, carboxyl group-containing PVA, formalized PVA, acetalized PVA, butyralized PVA, urethanated PVA, PVA esterified with an acid such as sulfonic acid or carboxylic acid, and hydrolyzed copolymers of a vinyl ester and other monomer copolymerizable therewith. The monomer copolymerizable with a vinyl ester includes, for instance, an olefin such as ethylene, butyrene, isobutyrene, α-octene, α-dodecene or α-octadecene, an unsaturated acid or its salts such as acrylic acid, methacrylic acid, crotonic acid, maleic acid, maleic anhydride or itaconic acid, a monoalkyl or dialkyl ester of the unsaturated acid, a nitrile compound such as acrylonitrile or methacrylonitrile, an amide such as acrylamide, diacetone acrylamide or methacrylamide, an olefin sulfonic acid or its salts such as ethylene sulfonic acid, allyl sulfonic acid or methallyl sulfonic acid, an alkyl vinyl ether, a vinyl ketone, N-vinylpyrrolidone, vinyl chloride, vinylidene chloride, and the like.

Examples of the water-soluble high molecular weight compound other than the above-mentioned polyvinyl alcohol resins are, for instance, cellulose derivatives such as methyl cellulose, ethyl cellulose, hydroxymethyl cellulose, hydroxypropylmethyl cellulose, hydroxybutylmethyl cellulose, hydroxyethyl cellulose, carboxymethyl cellulose, aminomethylhydroxypropyl cellulose and aminoethylhydroxypropyl cellulose, starch, traganth, pectin, glue, alginic acid or its salts, gelatin, polyvinylpyrrolidone, polyacrylic acid or its salts, polymethacrylic acid or its salts, polyacrylamide, polymethacrylamide, copolymers of vinyl acetate and an unsaturated acid such as maleic acid, maleic anhydride, acrylic acid, methacrylic acid, itaconic acid, fumaric acid or crotonic acid, copolymers of styrene and the unsaturated acid mentioned above, copolymers of a vinyl ether and the unsaturated acid mentioned above, salts or esters of these copolymers mentioned above, and the like.

Examples of the non-ionic surface active agent are, for instance, polyoxyethylene alkyl ethers, polyoxyethylene alkyl phenyl ethers, polyoxyethylene polyhydric alcohol esters, polyhydric alcohol fatty acid esters, oxyethylene-oxypropylene block copolymer, and the like.

Examples of the anionic surface active agent are, for instance, higher alcohol sulfate, higher fatty acid alkali metal salt, polyoxyethylene alkyl phenyl ether sulfate, alkyl benzene sulfonate, formaldehyde polycondensation of naphthalenesulfonate, alkyl diphenyl ether sulfonate, dialkyl sulfosuccinate, higher alcohol phosphate, and the like.

Further, a plasticizer such as phthalic acid esters or phosphoric acid esters and a pH controlling agent such as sodium carbonate, sodium acetate or sodium phosphate may be added to the polymerization system.

In order to improve the polymerization stability and mechanical stability of emulsions, it is preferable to conduct the emulsion polymerization in the presence of 10 to 500 ppm, especially 10 to 200 ppm, of a water-soluble polymerization inhibitor based on the weight of the monomer, while using the functional group-containing PVA of the present invention as an emulsifier.

The water-soluble polymerization inhibitor includes, for instance, a thiocyanic acid salt, a nitrous acid salt and a water-soluble sulfur-containing organic compound, but is not limited thereto. Examples of the thiocyanic acid salt are, for instance, ammonium thiocyanate, zinc thiocyanate, sodium thiocyanate, potassium thiocyanate, aluminum thiocyanate, and the like. Examples of the nitrous acid salt are, for instance, sodium nitrite, potassium nitrite, ammonium nitrite, calcium nitrite, silver nitrite, strontium nitrite, cesium nitrite, barium nitrite, magnesium nitrite, lithium nitrite, dicyclohexylammonium nitrite, and the like. Examples of the water-soluble sulfur-containing organic compound are, for instance, a hydroxy-substituted mercaptan such as mercapto ethanol, monothiopropylene glycol or thioglycerol; a mercaptan carboxylic acid such as thioglycollic acid, thiohydracrylic acid, thiolactic acid or thiomalic acid; an amino-substituted mercaptan such as thioethanol amine; a nitro-substituted mercaptan such as β-nitroethylmercaptan; a hydroxy-substituted bivalent mercaptan such as 1,2-dithioglycerol or 1,3-dithioglycerol; a dimercaptoketone such as 1,3-dimercaptoacetone; a dimercaptane carboxylic acid such as β,β-dithioisobutyric acid; a hydroxy-substituted sulfide such as thioglycol; a hydroxy-substituted sulfide such as thiodiglycol; a sulfide carboxylic acid such as thiodiglycollic acid, β,β-thiodipropionic acid or thiodilactic acid; an aldehyde-substituted sulfide such as β-methylthiopropionaldehyde; an amino-substituted sulfide such as β-aminoethylsulfide; a nitro-substituted sulfide such as β-nitroethylsulfide; a mercapto-substituted sulfide such as β-mercaptoethylsulfide; and the like.

The addition of the polymerization inhibitor is preferably conducted when the polymerization conversion of a monomer such as an acrylic monomer reaches 5 to 75%. If the inhibitor is added to the polymerization system in an earlier stage than 5% in polymerization conversion, the polymerization system becomes poor in dispersibility, so the obtained emulsion such as acrylic polymer emulsion contains many coarse particles. The addition of the inhibitor after the conversion reaches 75% is unfavorable from the viewpoints of an effect of suppressing formation of coarse particles and an effect of improving mechanical stability.

It is preferable that the polymerization initiator used when adding a water-soluble polymerization inhibitor is oil-soluble. More preferably, an oil-soluble polymerization initiator previously dissolved in a monomer is used since the formation of coarse particles is suppressed. Known oil-soluble polymerization initiators can be used in the present invention without restriction. Examples of the oil-soluble polymerization initiator are, for instance, a peroxydicarbonate compound such as diisopropyl peroxydicarbonate, di-2-ethylhexyl peroxydicarbonate or diethoxyethyl peroxydicarbonate; a peroxyester compound such as t-butyl peroxyneodecanoate or α-cumyl peroxyneodecanoate; a peroxide such as acetylcyclohexylsulfonyl peroxide; an azo compound such as azobisisobutyronitrile, azobis-2,4-dimethylvaleronitrile or azobis(4-methoxy-2,4-dimethylvaleronitrile); and the like.

Preparation of polymer emulsions by emulsification of polymer is carried out, for example, by dissolving the functional group-containing PVA in water, thereto adding dropwise a polymer of an ethylenically unsaturated monomer and/or a diene monomer in the form of a solution with stirring, and stirring the mixture to form an emulsion, or by adding dropwise an aqueous solution of the functional group-containing PVA to the polymer in the form of a solution with stirring, and stirring the mixture to form an emulsion. Heating is not particularly required upon the emulsification, but the emulsification may be conducted under heating at a temperature of 45 to 85° C. as occasion demands.

In the emulsification of polymer may be optionally used any of surface active agents as used in the emulsion polymerization explained above, including a non-ionic surface active agent such as polyoxyethylene alkyl ether, polyoxyethylene alkyl phenyl ether or polyhydric alcohol ester, and a cationic surface active agent such as higher alkyl amine salt. Also, these surface active agents may be incorporated into the polymer part to be emulsified. Further, a plasticizer such as phthalic acid esters and a pH controlling agent such as acetate or sodium phosphate may be used in the emulsificaiton of polymer.

The resin concentration of the emulsions is from 20 to 70% by weight, especially 30 to 60% by weight, more especially 40 to 55% by weight.

To the obtained emulsions may be optionally added various additives in accordance with the uses of the emulsions, e.g., crosslinking agent, water proofing agent, pigment, dispersing agent, defoaming agent, oiling agent, viscosity modifier, tackifier, thickener, water retaining agent, textile softening agent, leveling agent and antistatic agent.

From the thus obtained emulsion, water is removed to give the redispersible synthetic resin powder of the present invention. The method of removing water is not particularly limited, and various methods are adoptable, e.g, spray drying, heat drying, air drying, and freeze drying.

For spray drying of the emulsion can be used usual spray dryers wherein a liquid is dried by spraying it. Known spray dryers are classified into disk type and nozzle type based on the spraying form, and any of them can be used. Hot air, steam and the like are used as a heat source in the spray drying.

The heating conditions are suitably selected according to the size and kind of spray dryer, the concentration and viscosity of an emulsion, the flow rate and the like. The drying temperature is preferably from 80 to 150° C., especially from 100 to 140° C. If the drying temperature is lower than 80° C., the drying tends to be not sufficiently achieved. If the temperature is more than 150° C., the polymer may be deteriorated by heat.

There is a possibility that the redispersible emulsion powder aggregates to block during the storage by sticking of particles to each other. Accordingly, it is preferable to use an anti-blocking agent in order to improve the storage stability of the redispersible powder. The anti-blocking agent can be added to the emulsion powder obtained by spray-drying an emulsion, followed by uniform mixing. However, from the viewpoint that uniform mixing is achieved, it is preferable that upon spray-drying an emulsion, the emulsion is sprayed in the presence of an anti-blocking agent. In particular, it is preferable to simultaneously spray the emulsion and the anti-blocking agent to dry them.

Inorganic fine powder is preferably used as the anti-blocking agent, e.g., calcium carbonate, clay, silicic anhydride, aluminum silicate, white carbon, talc, alumina white, and the like. It is preferable that the average particle size of the inorganic powder is from about 0.01 to 0.5 $\mu$m. Silicic anhydride, aluminum silicate and calcium carbonate are preferred. The amount of the anti-blocking agent is not particularly limited, but preferably is from 2 to 20% by weight based on the emulsion powder.

The thus obtained redispersible synthetic resin powder of the present invention has an excellent redispersibility and can be easily re-emulsified into an aqueous medium, typically water, by adding the powder to the aqueous medium and stirring. The thus re-formed emulsion can be used in the same manner as the original emulsion.

The re-formed emulsion is useful as paper converting agent, adhesive, coating, textile processing agent, cosmetic, raw material for civil engineering and construction, pressure sensitive adhesive, and others.

In particular, the redispersible synthetic resin powder of the present invention is very useful as an admixture for cement and mortar. In case of using the redispersible powder as an admixture for cement and mortar, it is preferable to use it in an amount of 5 to 30 parts by weight, especially 10 to 30 parts by weight, more especially in the vicinity of 20 parts by weight, per 100 parts by weight of cement, from the viewpoint of physical properties of the hardened products. If economy should also be taken into consideration, it is preferable to use the redispersible powder in an amount of 5 to 15 parts by weight, especially 8 to 12 parts by weight, more especially in the vicinity of 10 parts by weight, per 100 parts by weight of cement. The redispersible powder can be incorporated into cement in a manner such as (a) previously incorporating the powder into cement, (b) previously incorporating the powder into water, and (c) simultaneously mixing cement, water and the powder.

The present invention is more specifically described and explained by means of the following Examples in which all parts and % are by weight unless otherwise noted.

PREPARATION EXAMPLE

[Preparation of functional group-containing PVA (PVA1 to PVA7)]

A kneader was charged with 100 parts of a solution consisting of 48 part of polyvinyl acetate prepared by solution polymerization (average degree of polymerization 300, measured by completely hydrolyzing the polyvinyl acetate and subjecting it to measurement according to JIS K6726), 38 parts of methanol and 14 parts of methyl acetate. The temperature was elevated to 40° C., and 3 parts of a 2% methanol solution of sodium hydroxide was added as a catalyst to the kneader. The hydrolysis was carried out at that temperature for 1.5 hours, and was then neutralized with acetic acid to stop the hydrolysis. The hydrolyzed polyvinyl acetate was repeatedly washed with methanol and dried to give a PVA powder having a degree of hydrolysis of 91.0% by mole (residual acetoxy group 9.0% by mole).

Then, 200 parts of the obtained PVA powder was charged into a kneader, and 20 parts of acetic acid was added thereto to swell the PVA powder. The temperature was elevated to 65° C. with stirring at 20 r.p.m., and to the kneader was added dropwise 3 parts of diketene over 4 hours. After the completion of the addition, the reaction was further continued for 30 minutes to give PVA1 having an acetoacetoxy group content (AA content) of 1.0% by mole, a block character of 0.40, a degree of hydrolysis of 91.0% by mole and an average degree of polymerization of 300.

The following PVA2 to PVA7 were prepared in the same manner as above, provided that PVA3 and PVA4 were prepared by conducting the solution polymerization of vinyl acetate in the presence of thiolacetic acid as a chain transfer agent instead of reacting polyvinyl acetate with diketene.

PVA2: AA content 0.05% by mole, block character 0.39, degree of hydrolysis 89.0% by mole, average degree of polymerization 400

PVA3: SH group content $3.3 \times 10^{-5}$ equivalent/1 g of PVA, block character 0.40, degree of hydrolysis 91.0% by mole, average degree of polymerization 550

PVA4: SH group content $4.0 \times 10^{-5}$ equivalent/1 g of PVA, block character 0.45, degree of hydrolysis 88.0% by mole, average degree of polymerization 510

PVA5: AA content 1.0% by mole, block character 0.41, degree of hydrolysis 90.0% by mole, average degree of polymerization 1,200

PVA6: AA content 1.0% by mole, block character 0.41, degree of hydrolysis 90.0% by mole, average degree of polymerization 820

PVA7: AA content 1.0% by mole, block character 0.41, degree of hydrolysis 90.0% by mole, average degree of polymerization 2,500

[Preparation of modified or non-modified PVA-X, PVA-Y and PVA-Z]

A kneader equipped with a reflux condenser was charged with 100 parts of a 40% methanol solution of the same polyvinyl acetate as above (average degree of polymerization 300). The temperature was elevated up to refluxing. When the refluxing started, 0.5 part of sulfuric acid was added as a catalyst to the kneader, and the hydrolysis was carried out for 17 hours. The reaction mixture was then neutralized with sodium hydroxide to stop the hydrolysis. The hydrolyzed polyvinyl acetate was repeatedly washed with methanol and dried to give a PVA powder having a degree of hydrolysis of 91.0% by mole (residual acetoxy group 9.0% by mole). The obtained PVA powder was reacted with diketene in the same manner as above to give PVA-X having an acetoacetoxy group content (AA content) of 1.0% by mole, a block character of 0.80, a degree of hydrolysis of 91.0% by mole and an average degree of polymerization of 300.

The following PVA-Y and PVA-Z were prepared according to the preparation of PVA-X, provided that PVA-Y was prepared by conducting the solution polymerization of vinyl acetate in the presence of thiolacetic acid as a chain transfer agent instead of reacting polyvinyl acetate with diketene, and PVA-Z was prepared without reacting the PVA powder with diketene.

PVA-Y: SH group content $3.3 \times 10^{-5}$ equivalent/1 g of PVA, block character 0.70, degree of hydrolysis 90.0% by mole, average degree of polymerization 550

PVA-Z: non-modified PVA, block character 0.40, degree of hydrolysis 90.0% by mole, average degree of polymerization 300

EXAMPLE 1

A separable flask equipped with a stirrer, a reflux condenser, a dropping funnel and a thermometer was charged with 90 parts of water, 10 parts of PVA1 prepared in the above Reference Example, 0.02 part of sodium acetate as a pH controlling agent and 10 parts of a monomer mixture of methyl methacrylate/n-butyl acrylate in a ratio of 55/45 by weight. The inner temperature was elevated to 60° C. with stirring, during which 5 ml of a 1% aqueous solution of ammonium persulfate was added to the flask to start the polymerization in a nitrogen stream. After conducting the initial polymerization for 30 minutes, 90 parts of the monomer mixture was added dropwise over 4 hours, during which 5 ml of a 1% aqueous solution of ammonium persulfate was divided into four portions and each was added every hour. Thereafter, the polymerization was further conducted at 75° C. for 1 hour. The reaction mixture was cooled to give an emulsion of a methyl methacrylate-n-butyl acrylate copolymer having a solid concentration of 50%.

In order to measure the polymerization stability of the obtained emulsion, the emulsion was diluted with water and filtered with a 100 mesh wire cloth. Polymer particles on the wire cloth was dried at 105° C. for 3 hours and weighed, and the content of coarse particles (%) was calculated according to the following equation.

Content of coarse particles (%)=(Weight of dry particles on wire cloth/Weight of solid of emulsion)×100

The smaller the coarse particle content, the higher the polymerization stability.

The emulsion was then spray-dried in a 120° C. hot air in the presence of 5% of silicic anhydride fine powder as an anti-blocking agent to give a redispersible synthetic resin powder.

The obtained redispersible synthetic resin powder was evaluated as follows:

(Blocking resistance)

The redispersible synthetic resin powder was placed in a cylindrical vessel and was loaded from the upper with a load of 30 g/cm². After allowing to stand at 20° C. and 65% RH for 1 month, the load was removed and the state of the powder was visually observed and evaluated according to the following criteria.

◯: No blocking occurs.

△: Blocking occurs partly.

✗: Blocking occurs markedly to form a mass.

(Redispersibility)

To 100 parts of deionized water was added 100 parts of the redispersible synthetic resin powder and was stirred to give a dispersion. The dispersion was sieved and the state of the dispersion was evaluated according to the following criteria.

◯: The proportion of particles of 325 mesh on is less than 10%.

△: The proportion of particles of 325 mesh on is from 10% to less than 40%.

✗: The proportion of particles of 325 mesh on is not less than 40%.

(Film forming property)

To 100 parts of deionized water was added 100 parts of the redispersible synthetic resin powder and was stirred to give a dispersion. The dispersion was cast on a glass plate in a dry film thickness of about 100 µm and dried at 50° C. for 6 hours to give a film. The film was evaluated according to the following criteria.

◯: Uniform and tough film is formed.

✗: No uniform and tough film is formed.

(Water resistance)

To 100 parts of deionized water was added 100 parts of the redispersible synthetic resin powder and was stirred to give a dispersion. The dispersion was cast on a glass plate in a dry film thickness of about 0.2 mm and dried at 50° C. for 6 hours to form a film on the glass plate. The glass plate was put on a news paper, and about 0.1 ml of a drop of water was dropped onto the film. The time until 8 point characters of the news paper became unreadable was measured and the water resistance was evaluated according to the following criteria.

◯: 30 seconds or more.

△: 5 to less than 30 seconds.

✗: less than 5 seconds.

The results are shown in Table 1.

To 100 parts of cement were added 10 parts of the redispersible synthetic resin powder, 300 parts of sand and 60 parts of water to give a mortar composition. The slump value of the composition and the properties of the hardened composition were measured as follows:

(Slump value)

Measured according to JIS A 1173

(Bending strength, compressive strength, adhesive strength and water absorption)

Measured according to JIS A 6203

(Impact resistance)

The mortar composition was molded and cured to a plate having a size of 6 cm×6 cm×0.35 cm. After aging the plate at 20° C. and 65% RH for 25 days, a 67 g steal ball was fallen on the plate and the falling height (cm) at breaking of the plate was measured.

The results are shown in Table 2.

EXAMPLE 2

An autoclave equipped with a nitrogen introducing inlet and a thermometer was charged with 100 parts of a 10% aqueous solution of PVA1. The solution was adjusted to pH 4 with sulfuric acid, and 60 parts of styrene and 1 part of t-dodecylmercaptan were added to the autoclave.

After purging air in the autoclave with nitrogen gas, 40 parts of butadiene was added to the autoclave. The temperature was elevated to 70° C. and the polymerization was conducted to give an emulsion of a styrene-butadiene copolymer having a solid concentration of 49.5%.

A redispersible synthetic resin powder was obtained from the emulsion in the same manner as in Example 1.

The polymerization stability of the emulsion and the properties of the residpersible powder were measured and evaluated in the same manner as in Example 1.

The results are shown in Tables 1 and 2.

EXAMPLE 3

An emulsion of a methyl methacrylate-n-butyl acrylate copolymer was prepared in the same manner as in Example 1 except that PVA2 was used instead of PVA1.

A redispersible synthetic resin powder was obtained from the emulsion in the same manner as in Example 1.

The polymerization stability of the emulsion and the properties of the residpersible powder were measured and evaluated in the same manner as in Example 1.

The results are shown in Tables 1 and 2.

EXAMPLE 4

An emulsion of a methyl methacrylate-n-butyl acrylate copolymer was prepared in the same manner as in Example 1 except that PVA3 was used instead of PVA1.

A redispersible synthetic resin powder was obtained from the emulsion in the same manner as in Example 1.

The polymerization stability of the emulsion and the properties of the residpersible powder were measured and evaluated in the same manner as in Example 1.

The results are shown in Tables 1 and 2.

EXAMPLE 5

An emulsion of a methyl methacrylate-n-butyl acrylate copolymer was prepared in the same manner as in Example 1 except that PVA2 was used instead of PVA1.

A redispersible synthetic resin powder was obtained from the emulsion in the same manner as in Example 1.

The polymerization stability of the emulsion and the properties of the residpersible powder were measured and evaluated in the same manner as in Example 1.

The results are shown in Tables 1 and 2.

EXAMPLE 6

An emulsion of a methyl methacrylate-n-butyl acrylate copolymer was prepared in the same manner as in Example 1 except that PVA5 was used instead of PVA1.

A redispersible synthetic resin powder was obtained from the emulsion in the same manner as in Example 1.

The polymerization stability of the emulsion and the properties of the residpersible powder were measured and evaluated in the same manner as in Example 1.

The results are shown in Tables 1 and 2.

EXAMPLE 7

An emulsion of a methyl methacrylate-n-butyl acrylate copolymer was prepared in the same manner as in Example 1 except that PVA6 was used instead of PVA1.

A redispersible synthetic resin powder was obtained from the emulsion in the same manner as in Example 1.

The polymerization stability of the emulsion and the properties of the residpersible powder were measured and evaluated in the same manner as in Example 1.

The results are shown in Tables 1 and 2.

EXAMPLE 8

An emulsion of a methyl methacrylate-n-butyl acrylate copolymer was prepared in the same manner as in Example 1 except that PVA7 was used instead of PVA1.

A redispersible synthetic resin powder was obtained from the emulsion in the same manner as in Example 1.

The polymerization stability of the emulsion and the properties of the residpersible powder were measured and evaluated in the same manner as in Example 1.

The results are shown in Tables 1 and 2.

EXAMPLE 9

A separable flask equipped with a stirrer, a reflux condenser, a dropping funnel and a thermometer was charged with 90 parts of water, 10 parts of PVA1 prepared in the above Reference Example, 0.02 part of sodium acetate as a pH controlling agent and 10 parts of a monomer mixture of methyl methacrylate/n-butyl acrylate in a ratio of 55/45 by weight containing 0.2 part of azobisisobutyronitrile based on 100 parts of the monomer mixture. The inner temperature was elevated to 65° C. with stirring. In a nitrogen stream, the initial polymerization was conducted for 30 minutes, and remaining 90 parts of the monomer mixture was then added dropwise over 4 hours. To the polymerization system was added 100 ppm of ammonium thiocyanate based on the total weight of the monomers charged 2 hours after starting the polymerization (at a polymerization conversion of 42%). After the completion of the dropwise addition of the monomer mixture, the polymerization was further conducted at 75° C. for 1 hour. The reaction mixture was cooled to give an emulsion of a methyl methacrylate-n-butyl acrylate copolymer having a solid concentration of 50%.

A redispersible synthetic resin powder was obtained from the emulsion in the same manner as in Example 1.

The polymerization stability of the emulsion and the properties of the residpersible powder were measured and evaluated in the same manner as in Example 1.

The results are shown in Tables 1 and 2.

EXAMPLE 10

An emulsion of a methyl methacrylate-n-butyl acrylate copolymer was prepared in the same manner as in Example 9 except that ammonium thiocyanate was used in an amount of 250 ppm.

A redispersible synthetic resin powder was obtained from the emulsion in the same manner as in Example 1.

The polymerization stability of the emulsion and the properties of the residpersible powder were measured and evaluated in the same manner as in Example 1.

The results are shown in Tables 1 and 2.

EXAMPLE 11

An emulsion of a methyl methacrylate-n-butyl acrylate copolymer was prepared in the same manner as in Example 9 except that 200 ppm of ammonium thiocyanate was added to the polymerization system 2.5 hours after starting the polymerization (at a polymerization conversion of 53%).

A redispersible synthetic resin powder was obtained from the emulsion in the same manner as in Example 1.

The polymerization stability of the emulsion and the properties of the residpersible powder were measured and evaluated in the same manner as in Example 1.

The results are shown in Tables 1 and 2.

EXAMPLE 12

An emulsion of a methyl methacrylate-n-butyl acrylate copolymer was prepared in the same manner as in Example 9 except that 200 ppm of ammonium thiocyanate was added to the polymerization system 1 hour after starting the polymerization (at a polymerization conversion of 18%).

A redispersible synthetic resin powder was obtained from the emulsion in the same manner as in Example 1.

The polymerization stability of the emulsion and the properties of the residpersible powder were measured and evaluated in the same manner as in Example 1.

The results are shown in Tables 1 and 2.

COMPARATIVE EXAMPLE 1

The procedure of Example 1 was repeated except that PVA-X was used instead of PVA1.

The results are shown in Tables 1 and 2.

COMPARATIVE EXAMPLE 2

The procedure of Example 1 was repeated except that PVA-Y was used instead of PVA1.

The results are shown in Tables 1 and 2.

COMPARATIVE EXAMPLE 3

The procedure of Example 1 was repeated except that PVA-Z was used instead of PVA1, but aggregation was observed during the polymerization. Since a good emulsion of a methyl methacrylate-n-butyl acrylate copolymer was not obtained, the evaluation was not conducted.

The redispersible synthetic resin powder of the present invention has excellent redispersibility and blocking resistance as well as excellent film forming property and water resistance. It is useful in various uses of emulsions such as paper converting agent, adhesives, coatings, textile processing agent, cosmetics, raw materials for civil engineering and construction, pressure sensitive adhesives, and others, and is particularly useful as an admixture for cement and mortar.

TABLE 2

| | Slump value | Bending strength (kg/cm$^2$) | Compressive strength (kg/cm$^2$) | Adhesive strength (kg/cm$^2$) | Water absorption (%) | Impact resistance (cm) |
|---|---|---|---|---|---|---|
| Ex. 1 | 36 | 72 | 340 | 34 | 2.5 | 360 |
| Ex. 2 | 36 | 72 | 340 | 33 | 2.7 | 360 |
| Ex. 3 | 36 | 69 | 350 | 32 | 2.9 | 365 |
| Ex. 4 | 36 | 68 | 330 | 32 | 3.0 | 340 |
| Ex. 5 | 36 | 67 | 320 | 32 | 3.0 | 320 |
| Ex. 6 | 36 | 68 | 330 | 33 | 2.9 | 330 |
| Ex. 7 | 36 | 67 | 320 | 32 | 2.9 | 320 |
| Ex. 8 | 36 | 70 | 330 | 34 | 2.8 | 330 |
| Ex. 9 | 36 | 73 | 360 | 34 | 2.5 | 367 |
| Ex. 10 | 37 | 72 | 348 | 34 | 2.5 | 362 |
| Ex. 11 | 36 | 72 | 364 | 34 | 2.5 | 365 |
| Ex. 12 | 36 | 73 | 368 | 35 | 2.5 | 367 |
| Com. Ex. 1 | 36 | 58 | 220 | 20 | 3.0 | 200 |
| Com. Ex. 1 | 36 | 56 | 200 | 18 | 3.0 | 180 |
| Com. Ex. 1 | 37 | Since good emulsion was not obtained, evaluation was not conducted. | | | | |

What is claimed is:

1. A redispersible synthetic resin powder comprising particles of a polymer made from at least one monomer selected from the group consisting of ethylenically unsaturated monomers and diene monomers, and a polyvinyl alcohol resin having an acetoacetoxy group, and a block character ($\eta$) of 0.3 to 0.6, wherein said polyvinyl alcohol resin is adsorbed onto the surface of said particles.

2. The redispersible powder of claim 1, wherein the content of the acetoacetoxy group is from 0.01 to 6% by mole.

3. The redispersible powder of claim 1, wherein said polyvinyl alcohol resin has an average degree of polymerization of 50 to 2,000.

4. The redispersible powder of claim 1, wherein said polyvinyl alcohol resin has a degree of hydrolysis of 85 to 99% by mole.

TABLE 1

| | Modified PVA | Polymerization stability (%) | Blocking resistance | Redispersiblity | Film forming property | Water resistance |
|---|---|---|---|---|---|---|
| Ex. 1 | PVA1 | 0.02 | ○ | ○ | ○ | ○ |
| Ex. 2 | PVA1 | 0.01 | ○ | ○ | ○ | ○ |
| Ex. 3 | PVA2 | 0.03 | ○ | ○ | ○ | ○ |
| Ex. 4 | PVA3 | 0.04 | ○ | ○ | ○ | ○ |
| Ex. 5 | PVA4 | 0.04 | ○ | ○ | ○ | ○ |
| Ex. 6 | PVA5 | 0.18 | ○ | ○ | ○ | ○ |
| Ex. 7 | PVA6 | 0.09 | ○ | ○ | ○ | ○ |
| Ex. 8 | PVA7 | 0.82 | ○ | ○ | ○ | ○ |
| Ex. 9 | PVA1 | 0.005 | ○ | ○ | ○ | ○ |
| Ex. 10 | PVA1 | 0.008 | ○ | ○ | ○ | ○ |
| Ex. 11 | PVA1 | 0.006 | ○ | ○ | ○ | ○ |
| Ex. 12 | PVA1 | 0.003 | ○ | ○ | ○ | ○ |
| Com. Ex. 1 | PVA-X | 3.0 | Δ | Δ | X | ○ |
| Com. Ex. 2 | PVA-Y | 3.5 | Δ | Δ | X | Δ |
| Com. Ex. 3 | PVA-Z | Since good emulsion was not obtained, evaluation was not conducted. | | | | |

5. The redispersible powder of claim 1, wherein said ethylenically unsaturated monomer is an acrylic monomer.

6. A redispersible synthetic resin powder comprising particles of a polymer made from at least one monomer selected from the group consisting of ethylenically unsaturated monomers and diene monomers and a polyvinyl alcohol resin having at least one functional group selected from the group consisting of acetoacetoxy group and mercapto group and having a block character ($\eta$) of 0.3 to 0.6, wherein said polymer particles are prepared by conducting an emulsion polymerization of said at least one monomer and said polyvinyl alcohol resin is adsorbed onto the surface of said particles.

7. The redispersible powder of claim 6 wherein said emulsion polymerization is conducted in the presence of 0.1 to 30.0% by weight of said polyvinyl alcohol resin based on the total weight of the emulsion polymerization system.

8. The redispersible powder of claim 6 wherein said emulsion polymerization is conducted in the presence of a polymerization inhibitor which is added to the polymerization system when the polymerization conversion has reached 5 to 70%.

9. The redispersible powder of claim 6 wherein said polyvinyl alcohol resin is a polyvinyl alcohol resin having 0.01 to 6.0% by mole of acetoacetoxy group.

10. The redispersible powder of claim 6 wherein said polyvinyl alcohol resin has an average degree of polymerization of 50 to 2,000.

11. The redispersible powder of claim 6 wherein said polyvinyl alcohol resin has a degree of hydrolysis of 85–90% by mole.

12. The redispersible powder of claim 6 wherein said ethylenically unsaturated monomer is an acrylic monomer.

13. A composition comprising a cement and a redispersible synthetic resin powder, said redispersible powder comprising particles of a polymer made from at least one monomer selected from the group consisting of ethylenically unsaturated monomers and diene monomers and a polyvinyl alcohol resin having at least one functional group selected from the group consisting of acetoacetoxy group and mercapto group and having a block character ($\eta$) of 0.3 to 0.6, wherein said polyvinyl alcohol resin is adsorbed onto the surface of said particles.

14. The composition of claim 13 wherein said polyvinyl alcohol resin is a polyvinyl alcohol resin having 0.01 to 6.0% by mole of acetoacetoxy group.

15. The composition of claim 13 wherein said polyvinyl alcohol resin has an average degree of polymerization of 50 to 2,000.

16. The composition of claim 13 wherein said polyvinyl alcohol resin has a degree of hydrolysis of 85 to 99% by mole.

17. The composition of claim 13 wherein said ethylenically unsaturated monomer is an acrylic monomer.

18. The composition of claim 13 wherein said polymer particles are prepared by conducting an emulsion polymerization of said at least one monomer.

19. The composition of claim 13 wherein said polymer particles are prepared by conducting an emulsion polymerization of said at least one monomer in the presence of a polymerization inhibitor which is added to the polymerization system when the polymerization conversion has reached 5 to 70%.

20. The composition of claim 18 wherein said emulsion polymerization is conducted in the presence of 0.1 to 30.0% by weight of said polyvinyl alcohol resin based on the total weight of the emulsion polymerization system.

* * * * *

UNITED STATES PATENT AND TRADEMARK OFFICE
CERTIFICATE OF CORRECTION

PATENT NO. : 6,602,937 B2
DATED : August 5, 2003
INVENTOR(S) : Hara et al.

It is certified that error appears in the above-identified patent and that said Letters Patent is hereby corrected as shown below:

Column 3,
Lines 50-51, "methacryalte" should be -- methacrylate --;

Column 4,
Line 62, "a" should be -- an --;

Column 7,
Line 32, ")" should be -- ] --;

Column 8,
Lines 33-34, "funcitonal group-contaiing" should be -- functional group-containing --;

Column 11,
Lines 9-10, "emulsificaiton" should be -- emulsification --;

Column 14,
Line 61, "steal" should be -- steel --;

Column 15,
Lines 12, 23, 35, 47 and 58 "residpersible" should be -- redispersible --;

Column 16,
Lines 2, 13, 40, 52 and 65, "residpersible" should be -- redispersible --;

Column 17,
Line 11, "residpersible" should be -- redispersible --;

UNITED STATES PATENT AND TRADEMARK OFFICE
CERTIFICATE OF CORRECTION

PATENT NO. : 6,602,937 B2
DATED : August 5, 2003
INVENTOR(S) : Hara et al.

It is certified that error appears in the above-identified patent and that said Letters Patent is hereby corrected as shown below:

<u>Column 18</u>,
Line 22, "Ex. 1" should be -- Ex. 2 --;
Line 24, "Ex. 1" should be -- Ex. 3 --.

Signed and Sealed this

Ninth Day of March, 2004

JON W. DUDAS
*Acting Director of the United States Patent and Trademark Office*